Patented Apr. 22, 1947

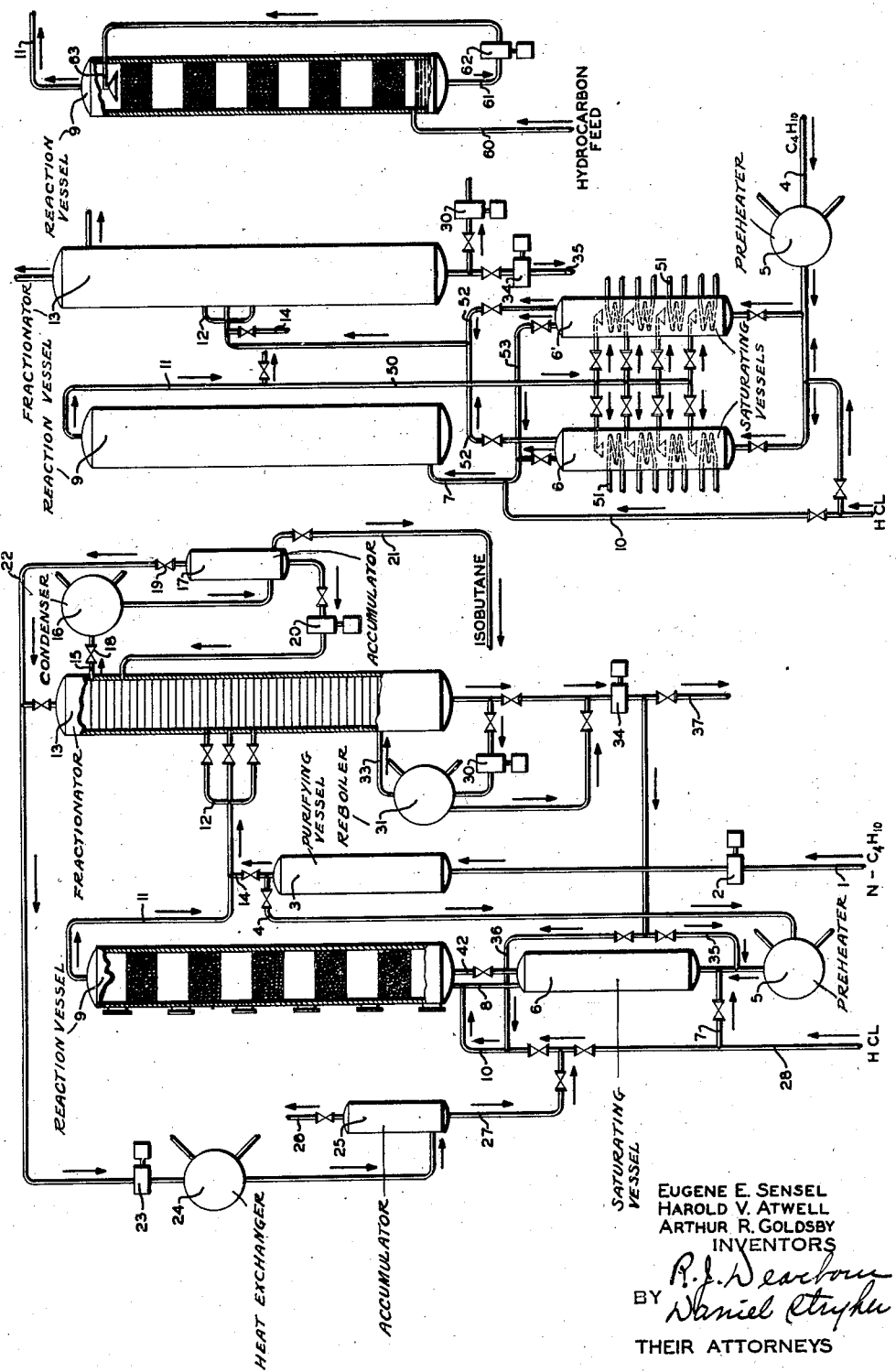

2,419,423

UNITED STATES PATENT OFFICE 2,419,423

ISOMERIZATION OF NORMAL PARAFFIN HYDROCARBONS

Eugene E. Sensel, Harold V. Atwell, and Arthur R. Goldsby, Beacon, N. Y., assignors, by mesne assignments, to The Texas Company, New York, N. Y., a corporation of Delaware Application June 30, 1939, Serial No. 282,054

3 Claims. (Cl. 260—683.5)

This invention relates to the conversion of hydrocarbons and has to do with the isomerization of normal paraffins to isoparaffins. It is applicable particularly with respect to the isomerization of normal butane to isobutane.

A continuous method of isomerizing normal paraffin hydrocarbons, particularly normal butane, involves subjecting the normal paraffin hydrocarbon, in the liquid phase, to contact with an anhydrous aluminum halide catalyst and a hydrogen halide promoter at temperatures of about 150 to 275° F., whereby the isoparaffin hydrocarbon is formed.

The present invention involves saturating the hydrocarbon feed in such an isomerization process with the catalyst at approximately the conversion temperature. The hydrocarbon feed, saturated with the catalyst and in liquid phase, is passed through a reaction zone wherein it is brought into contact with the catalyst, whereby isoparaffin hydrocarbons are formed.

The hydrocarbon mixture leaving the reaction zone is diluted with an additional quantity of normal paraffin or paraffin-isoparaffin mixture and the dilute mixture passed to a fractionating zone. The fractionation is regulated so as to produce a vapor fraction comprising isoparaffin hydrocarbons which is removed.

The bottoms from the fractionation comprise unreacted normal paraffin hydrocarbons in liquid form containing dissolved catalyst. These are recycled to the saturating and isomerizing zones.

It is contemplated effecting the conversion with the catalyst, such as anhydrous aluminum chloride, in the presence of an anhydrous hydrogen halide, such as hydrogen chloride. The promoter may be mixed with the hydrocarbon feed subsequent to saturating with the catalyst.

The reaction is carried on under superatmospheric pressure sufficient to maintain the paraffin hydrocarbons in the liquid phase. The pressure will depend upon the temperature used and, in the case of normal butane, will vary from 150 to 500 pounds per square inch. The temperature may range from 150 to 275° F. and is preferably around 200 to 250° F.

In order to illustrate the invention further reference is made to the accompanying drawing, which shows diagrammatically methods of flow adapted for carrying out the invention:

As shown in Fig. 1, the hydrocarbon feed comprising, for example, normal butane, or a mixture consisting predominantly of normal butane, is conducted from a source not shown through a pipe 1, and by means of a pump 2 passed under pressure and in liquid phase to a purifying vessel 3, or a series of such vessels, wherein the butane is agitated or contacted with sulphuric acid or other chemical agent or mixture, such as aluminum chloride admixed with hydrogen chloride, in order to remove olefins and other undesired compounds. In the event that the normal butane charged is free from olefins and other undesirable compounds, the purifying step may be omitted. The purified butane, or a mixture consisting primarily of normal butane, is transferred from the purifier 3 through a pipe 4 to a preheater 5, wherein it is raised to the desired temperature, which may be approximately equal to, or slightly above, the temperature of conversion prevailing in the subsequent isomerization step.

From the preheater 5 the normal butane passes through a saturating vessel 6. The vessel 6 may be provided with means for heating or for maintaining the temperature at the desired elevation. Anhydrous hydrogen chloride may be introduced to the vessel 6 through a pipe 7. The vessel 6 contains aluminum chloride or other aluminum halides with which to saturate the butane. During passage through the vessel 6 the butane becomes saturated with the catalyst and the saturated mixture is discharged therefrom through a pipe 8 to a reaction vessel 9. Vessel 6 also serves as an additional purifier for the butane feed, serving to remove any pentanes or higher hydrocarbons resulting from recycling or introduced with the fresh feed.

The reaction vessel 9 may conveniently take the form of a vertical tower and contains the catalyst in solid or lump form. If desired, the catalyst may be deposited on an inert support, e. g., alumina, clay, pumice, coke, brick, etc. As indicated, the catalyst may be disposed in a series of beds one above the other within the tower.

The vessel 9 is operated at any desired temperature in order to accomplish substantial isomerization of normal butane to isobutane. Although upward flow of the hydrocarbon feed through the reaction vessel 9 is indicated, it is contemplated that downward flow may be employed, if desired.

Additional promoter or the entire feed thereof may be introduced to the reaction vessel 9 by means of a pipe 10, the promoter being mixed with the hydrocarbon mixture passing to the vessel 9.

While a portion of the promoter may be introduced prior to passage through the saturator 6, it is contemplated that all, or substantially all, of the promoter may be added to the hydrocarbon mixture subsequent to passage through the vessel 6.

The products of isomerization comprising essentially normal butane and isobutane, still saturated with aluminum chloride and containing hydrogen chloride promoter, are transferred from the top of the vessel 9 through a pipe 11 to a manifold 12, providing a means of introduction to a fractionating tower 13.

An additional quantity of normal butane, or fresh charge containing primarily normal butane, is mixed with the isomerized products prior to introduction to the fractionating tower 13. This additional butane is introduced through a pipe 14, communicating with pipe 4 previously mentioned.

The amount of normal butane, or fresh charge consisting primarily of normal butane, added as a diluent preferably corresponds in volume to approximately the amount of isobutane contained in the products of isomerization. It should be sufficient to retain the catalyst in solution within the fractionator 13 upon removal of the isobutane from the hydrocarbon mixture entering the fractionator.

The purpose of this additional butane is to avoid deposition of the catalyst in solid form upon the bubble trays within the fractionator.

Pipe 11, manifold 12, and tower 13 are maintained at the same temperature as that prevailing in the reaction vessel 9, or even at a slightly higher temperature in order to prevent precipitation from solution of aluminum chloride.

The fractionator 13 is operated so as to remove, through pipe 15, a vapor fraction comprising isobutane. This fraction will contain hydrogen chloride and may contain some normal butane. It is passed to a condenser 16, wherein it is cooled, and from there it passes to an accumulator 17. Hydrogen chloride may be removed directly from the top of the fractionator through a pipe communicating with a pipe 22 to which reference will be made later.

The pressure in the fractionating tower 13 is maintained constant by means of a valve 18, while the pressure in the accumulator 17 is maintained by a valve 19.

A portion of the liquefied isobutane fraction collecting in the accumulator 17 is withdrawn by means of a pump 20 and returned to the upper portion of the fractionator 13 as a reflux.

The surplus isobutane liquid is drawn off from the accumulator through a pipe 21 and may be subjected to such further treatment as desired, in order to remove and recover any hydrogen chloride contained therein.

The hydrogen chloride, hydrocarbons lighter than isobutane, and fixed gases from the accumulator 17 are drawn off through the valve 19 and recycled through a pipe 22 to a compressor 23, wherein they are compressed. In this way certain of the hydrocarbons are liquefied. The compressed and liquefied gases pass through a heat exchanger 24 to an accumulator 25.

The fixed gases, together with a portion of the gaseous hydrogen chloride, are periodically released through a valve 26 to an auxiliary system not shown, where the hydrogen chloride may be recovered, if desired.

Hydrogen chloride from the recovery system is introduced through a pipe 27 which communicates with pipes 10 and 7 previously referred to. Further, the liquefied hydrocarbons containing dissolved hydrogen chloride may be charged through line 27 to pipes 10 and 7, to thereby recycle directly a portion of the hydrogen chloride.

Referring again to the fractionator 13, the normal butane, or butane containing fraction, which is introduced through the pipe 14 for diluting the isomerized products, may be heated in a separate zone not shown before it enters the pipe 11. The butanes coming from the reaction vessel 9 are saturated with aluminum chloride at the temperature prevailing within the vessel 9. As the stream of fresh normal butane, or mixture comprising essentially normal butane, from pipe 14 mixes with the solution in pipe 11, the resulting mixture becomes less concentrated with respect to aluminum chloride. When the mixture enters the fractionator 13 and is subjected to fractionation, the normal butane, or butane containing fraction, which was introduced through pipe 14, dissolves that aluminum chloride which would otherwise drop out of solution from the isobutane as the latter proceeds in the gaseous form upward through the fractionator in the process of fractionation. In this manner the aluminum chloride is prevented from precipitating out in the solid phase.

The solution of aluminum chloride in normal butane and any heavier hydrocarbons in the fractionator 13 proceeds downwardly and is withdrawn by a pump 30 and transferred to a reboiler 31.

The material vaporized in the reboiler 31 is returned to the lower portion of the fractionator 13 through a pipe 33.

The excess and unvaporized liquid from the bottom of the fractionator 13 and from the reboiler 31 is withdrawn by means of a pump 34 and conducted, all or in part, through a pipe 35 to the saturator 6. If desired, it may be recycled directly to the reaction vessel 9 through a pipe 36. That portion not returned either to the saturator 6 or the reaction vessel 9 is drawn off from the system through a pipe 37.

Any catalyst or catalyst complex accumulating in the lower portion of vessel 9 can be discharged through a pipe 42 into the saturator 6. Also, used catalyst discharged from any of the trays of tower 9 can be employed in saturator 6. On the other hand, the saturator 6 may be charged with fresh catalyst.

The process as described above is not limited to the use of aluminum chloride as a catalyst. The method can be applied with any normal butane isomerization catalyst which is soluble in the butanes, namely aluminum bromide and aluminum iodide. Aluminum bromide has several advantages, one of which is a low melting point (197° F.), which makes it possible to handle it as a liquid in properly heated lines and apparatus. Aluminum bromide can be distilled as a liquid at atmospheric pressure in contrast to aluminum chloride which sublimes at atmospheric pressure at 352° F. without previous fusion.

Mixtures of catalysts can be used, e. g., mixtures comprising two or more of the following: Aluminum chloride, aluminum bromide, and aluminum iodide. The catalyst is employed in an anhydrous condition.

Anhydrous hydrogen halides are used as promoters singly or in mixtures, with themselves or other promoters. Hydrogen chloride, hydrogen bromide, hydrogen iodide, and hydrogen fluoride are contemplated. The percentage of promoter added may be around 0.1 to 20% by weight of the butane charged, although from 0.5 to 2% is preferred.

The contact time in the vessel 9 may vary from a few minutes to an hour or more, depending upon the percentage conversion to isobutane desired and other operating conditions.

It is contemplated that the process is applicable to the isomerization of hydrocarbons other than normal butane, as, for example, normal pentane, naphtha and various fractions thereof, etc.

Fig. 2 illustrates an alternative arrangement of apparatus suitable where it is desired to operate the fractionating tower 13 at a temperature lower than that prevailing in the reactor 9. For example, it is advantageous to operate the fractionating tower at a temperature of about 150° F. or lower to permit lower pressures to be used therein.

As indicated in Fig. 2, the products of isomerization leaving the top of the vessel 9, through the pipe 11, instead of being passed directly to the fractionator 13, are passed through a pipe 50 communicating with vessels 6 and 6' through a pipe manifold adapted to provide a plurality of points of introduction to the vessels 6 and 6'. The pipe connections are such that the stream from pipe 50 can be alternated from one vessel to the other.

The vessels 6 and 6' may be equipped with agitating means, if desired. They are provided with a plurality of coils 51, through which a cooling or heating medium may be passed as desired.

In operation the products of isomerization passing through the pipe 50 are introduced, for example, to the lower portion of the vessel 6', the interior of which is maintained at a temperature of around 150° F. or thereabouts by circulating a cooling medium through the lower coils. The products of isomerization are thus reduced in temperature within the vessel 6', which causes precipitation of a portion of the dissolved aluminum chloride.

The partially cooled liquid products pass upwardly through the vessel 6' and are discharged therefrom through pipe 52 communicating with pipe manifold 12, previously referred to in the discussion of Fig. 1 and which provides a means of introduction to the fractionating tower 13. After introduction through the manifold 12 the hydrocarbons are subjected to fractionation within the fractionator 13 in a manner similar to that already described in connection with Fig. 1.

When the vessel 6' is substantially filled to capacity with precipitated aluminum chloride, the flow of isomerization products through pipe 50 is diverted from the vessel 6' to the vessel 6, which is in turn cooled to cause precipitation and deposition of aluminum chloride within the vessel. Similarly, the cooled isomerization products from the vessel 6 pass through pipe 52 to the fractionator 13.

When the vessel 6 is being used as a precipitator in which aluminum chloride is being deposited, the vessel 6', previously filled with precipitated aluminum chloride, is used as a saturator. Thus, the incoming hydrocarbon feed to the tower 9 from the heater 5 is passed upwardly through the vessel 6'. During this time the vessel 6' is maintained at about the same temperature as that prevailing in the reaction vessel 9, or even at a somewhat higher temperature. The desired temperature may be maintained by passing steam through the coils 51 within the vessel 6'.

It is, of course, contemplated that paraffin hydrocarbons being recycled through the system may also pass through whichever of the vessels 6 and 6' is being used as a saturator.

The hydrocarbon feed, after passage through the saturating vessel, is discharged therefrom through a pipe 53 communicating with pipe 7 previously referred to in the discussion of Fig. 1 and which provides a means of introduction of hydrocarbon feed to the vessel 9.

When the vessel 6 has become filled with deposited aluminum chloride then the flow of fluids is reversed so that the fresh feed hydrocarbons pass through the vessel 6, while the isomerization products pass through the vessel 6'.

As indicated, hydrogen chloride may be introduced by line 10 to the line leading from the vessels 6 and 6' to the vessel 9, as already described in connection with Fig. 1.

Additional aluminum chloride may be added periodically to the vessels 6 and 6' to replace any catalyst that is converted into complex compounds, with the hydrocarbons, or otherwise, rendered inactive during the process.

As already mentioned, the hydrocarbons may be introduced to the vessels 6 and 6' at a plurality of points, so that the isomerization products from the vessel 9 may be progressively introduced at higher levels as the vessels become filled to higher levels with precipitated catalyst, due to the cooling of the products within the vessel. Provision may be made for confining the flow of cooling water first to the lower coils of the vessel, and as this portion of the vessel fills with catalyst the cooling water is introduced to successively higher coils, while at the same time the isomerization products are likewise introduced at correspondingly higher levels.

Fig. 3 illustrates a method of operating the reaction vessel 9 when using aluminum bromide as the catalyst in molten form. The vessel 9 is packed with suitable packing material, such as flint, Raschig rings, etc., adapted to facilitate distribution of the fluids within the tower and to provide contact between the hydrocarbons rising through the tower and the molten catalyst flowing downwardly therethrough.

The hydrocarbon feed is introduced to the tower at a point below the lower bed of packing material through a pipe 60.

A body of molten catalyst accumulates in the bottom of the vessel 9 and is drawn off through a pipe 61 by a pump 62, which returns the molten catalyst to the top of the tower. In the top of the tower there is provided a spray or distributor 63, which distributes the returning catalyst over the packing material.

The isomerized hydrocarbons are drawn off from the top of the tower through the pipe 11, as described in connection with Figs. 1 and 2.

Obviously many modifications and variations of the invention, as hereinbefore set forth, may be made without departing from the spirit and scope thereof, and therefore only such limitations should be imposed as are indicated in the appended claims.

We claim:

1. In a continuous process of subjecting normal paraffin hydrocarbons to contact with an active metallic halide isomerization catalyst during passage in liquid phase through primary and secondary zones of contact with the catalyst at a temperature within the range of 150 to 275° F. to effect substantial conversion to isoparaffins, and such that a portion at least of the catalyst in the secondary zone forms metallic halide-hydrocarbon complex, the steps comprising passing the hydrocarbon feed to said primary zone, subjecting the feed to intimate contact in the primary zone with active metallic halide including complex formed in said secondary zone at approximately the conversion temperature, passing the preliminarily treated feed from said primary zone to said secondary zone arranged at an elevation above said primary zone, subjecting the hydrocarbons in the secondary zone to intimate contact with relatively fresh metallic halide confined therein in solid form at the conversion temperature, removing the so-treated hydrocarbons from the secondary zone, removing the complex formed in said secondary zone and passing it by gravity to said primary zone for contact with fresh hydrocarbon feed.

2. In a continuous process of subjecting normal paraffins to contact with aluminum chloride and a small amount of hydrogen chloride during passage in liquid phase through primary and secondary zones of contact with the catalyst, at least a portion of the catalyst in the secondary zone forming aluminum chloride-hydrocarbon complex, the steps comprising passing a hydrocarbon feed containing mainly normal butane to said primary zone, subjecting the feed to intimate contact therein with active aluminum chloride including complex formed in said secondary zone at a temperature in the range 150 to 275° F., passing the treated hydrocarbons from the primary zone to the secondary zone arranged at an elevation above said primary zone, subjecting the hydrocarbons in the secondary zone to intimate contact with relatively fresh aluminum chloride confined therein in solid form at a temperature within the aforesaid range, such that substantial conversion to isoparaffin occurs, removing the treated hydrocarbons from the secondary zone, removing the complex formed therein, and passing the removed complex by gravity to the primary zone for contact with fresh hydrocarbon feed.

3. In the continuous catalytic isomerization of normal butane in the presence of an aluminum chloride catalyst and hydrogen chloride promoter, wherein a fresh feed consisting predominantly of normal butane is preheated to a temperature of about 150 to 275° F. and passed in liquid phase in contact with solid aluminum chloride in the absence of added hydrogen chloride in a saturating step to dissolve aluminum chloride, then the preheated normal butane feed containing dissolved aluminum chloride is passed in liquid phase through an isomerizing zone containing aluminum chloride catalyst and added hydrogen chloride promoter under isomerizing conditions including a temperature of about 150 to 275° F. effective to convert a substantial proportion of the normal butane to isobutane with the production of a small amount of pentane, and a stream of hydrocarbon reaction products containing hydrogen chloride is continuously discharged therefrom, the improvement which comprises fractionating the said discharged stream to separate therefrom (1) a lighter vapor fraction comprising hydrogen chloride, (2) an isobutane fraction which is discharged as a final product, and (3) a heavier fraction consisting predominantly of normal butane free from hydrogen chloride and containing a small amount of pentane, recycling at least a portion of said heavier fraction to the saturating step whereby pentane is removed therefrom and the purified recycle normal butane dissolves aluminum chloride in the absence of hydrogen chloride and is passed with fresh feed to the isomerizing zone, and recycling hydrogen chloride from fraction (1) and introducing the same into the fresh and recycle normal butane feed containing dissolved aluminum chloride passing from the saturating step to the isomerizing zone so that the hydrogen chloride recycle is mixed with the fresh and recycle normal butane feed subsequent to the said saturating step and prior to introduction into the isomerizing zone.

EUGENE E. SENSEL.
HAROLD V. ATWELL.
ARTHUR R. GOLDSBY.

REFERENCES CITED

The following references are of record in the file of this patent:

UNITED STATES PATENTS

| Number | Name | Date |
|---|---|---|
| 2,169,494 | Ipatieff et al. | Aug. 15, 1939 |
| 1,665,406 | Danckwardt | Apr. 10, 1928 |
| 2,198,595 | Amos et al. | Apr. 30, 1940 |
| 1,373,653 | Danckwardt | Apr. 5, 1921 |
| 1,381,098 | Alexander et al. | June 14, 1921 |
| 1,620,075 | Clancy | Mar. 8, 1927 |
| 1,716,372 | Downs | June 11, 1929 |
| 1,872,446 | Halloran et al. | Aug. 16, 1932 |
| 2,071,521 | Hartmann et al. | Feb. 23, 1937 |
| 2,220,092 | Evering | Nov. 5, 1940 |
| 2,266,011 | d'Ouville et al. (A) | Dec. 16, 1941 |
| 2,266,012 | d'Ouville et al. (B) | Dec. 16, 1941 |
| 2,347,266 | Ipatieff et al. | Apr. 25, 1944 |

FOREIGN PATENTS

| Number | Country | Date |
|---|---|---|
| 498,463 | British | Jan. 5, 1939 |
| 498,512 | British | Jan. 5, 1939 |
| 823,595 | French | Jan. 22, 1938 |

OTHER REFERENCES

Glasebrook et al., J. A. C. S. 58, 1944–48, (1936).
Moldavskii et al., J. Gen. Chem. (USSR) 5 1791–97 (1935).
Petrov et al., Oil & Gas J., Feb. 2, 1939, pp. 42 and 46.
Ipatieff et al., Jor. Ind. Eng. Chem., vol. 28, 461–4.